United States Patent [19]

Rost et al.

[11] Patent Number: 5,659,319
[45] Date of Patent: Aug. 19, 1997

[54] METHOD AND APPARATUS FOR OPERATING A SURFACE DETECTION SURVEILLANCE RADAR USING FREQUENCY AGILE PULSE TRANSMISSIONS

[75] Inventors: David P. Rost, Malverne; Carl E. Schwab, Huntington Station, both of N.Y.

[73] Assignee: Cardion, Inc., Woodbury, N.Y.

[21] Appl. No.: 576,722

[22] Filed: Dec. 21, 1995

[51] Int. Cl.$^6$ ................................................ G01S 13/24
[52] U.S. Cl. ........................... 342/36; 342/176; 342/159
[58] Field of Search ....................... 342/36, 176, 184, 342/46, 131, 132, 137, 179, 158, 133, 113, 146, 159; 343/767, 768, 769, 770, 771

[56] References Cited

U.S. PATENT DOCUMENTS

| | | | |
|---|---|---|---|
| 3,931,624 | 1/1976 | Hundley et al. | 343/768 |
| 4,129,872 | 12/1978 | Toman | 343/768 |
| 4,206,463 | 6/1980 | Glasgow | 342/159 |
| 4,213,126 | 7/1980 | Mulder et al. | 342/36 |
| 4,516,125 | 5/1985 | Schwab et al. | 342/36 |
| 4,712,108 | 12/1987 | Schwab | 342/26 |
| 4,853,699 | 8/1989 | Easton | 342/25 |

*Primary Examiner*—Daniel T. Pihulic
*Attorney, Agent, or Firm*—Lawrence C. Edelman

[57] ABSTRACT

In accordance with the principles of the invention, a surveillance radar is provided with a rotating, frequency squinting, end-fed slotted array antenna, which is caused to transmit a plurality of different carrier frequency pulses for successively illuminating specific antenna beam positions during rotation of the antenna. Upon reception of each radar signal return, a signal processor responsive to the frequency of each transmitted pulse and the mechanical pointing angle of the antenna at the time of transmission of each pulse, will determine the frequency dependent squint angle for the transmitted pulse and combine that angle with the instantaneous mechanical pointing angle of the antenna at the time of the pulse transmission, to determine the actual beam pointing angle for each pulse at the time of its transmission. A video signal processor groups together the pulse signal returns from physically adjacent ones of the actual beam pointing angles for common processing, i.e, integration, for improving the target detection performance of the radar system.

13 Claims, 9 Drawing Sheets

FIG. 4

```
100 REM X=RND
110 REM X=INT (RND*20)
115 X=Fr
116 REM X=Fr1
120 Bp=Az+(Fr*.0225)+(X-9)*(.007*25)
```

| PULSE | FREQ | PRI# | AZ: MECH/TRUE |
|---|---|---|---|
| 1 | 19 | 589 | 13.253/ 15.003 |
| 2 | 17 | 606 | 13.635/ 15.035 |
| 3 | 18 | 607 | 13.658/ 15.233 |
| 4 | 15 | 623 | 14.018/ 15.068 |
| 5 | 16 | 624 | 14.040/ 15.265 |
| 6 | 13 | 640 | 14.400/ 15.100 |
| 7 | 14 | 641 | 14.423/ 15.298 |
| 8 | 11 | 657 | 14.783/ 15.133 |
| 9 | 12 | 658 | 14.805/ 15.330 |
| 10 | 9 | 674 | 15.165/ 15.165 |
| 11 | 10 | 675 | 15.188/ 15.363 |
| 12 | 6 | 690 | 15.525/ 15.000 |
| 13 | 7 | 691 | 15.548/ 15.198 |
| 14 | 8 | 692 | 15.570/ 15.395 |
| 15 | 4 | 707 | 15.908/ 15.033 |
| 16 | 5 | 708 | 15.930/ 15.230 |
| 17 | 2 | 724 | 16.290/ 15.065 |
| 18 | 3 | 725 | 16.313/ 15.263 |
| 19 | 1 | 742 | 16.695/ 15.295 |

| PULSE | FREQ | PRI# | AZ: MECH/TRUE |
|---|---|---|---|
| 1 | 19 | 608 | 13.680/ 15.430 |
| 2 | 17 | 625 | 14.063/ 15.463 |
| 3 | 18 | 626 | 14.085/ 15.660 |
| 4 | 15 | 642 | 14.445/ 15.495 |
| 5 | 16 | 643 | 14.468/ 15.693 |
| 6 | 13 | 659 | 14.828/ 15.528 |
| 7 | 14 | 660 | 14.850/ 15.725 |
| 8 | 11 | 676 | 15.210/ 15.560 |
| 9 | 12 | 677 | 15.233/ 15.758 |
| 10 | 9 | 693 | 15.593/ 15.593 |
| 11 | 10 | 694 | 15.615/ 15.790 |
| 12 | 6 | 709 | 15.953/ 15.428 |
| 13 | 7 | 710 | 15.975/ 15.625 |
| 14 | 4 | 726 | 16.335/ 15.460 |
| 15 | 5 | 727 | 16.358/ 15.658 |
| 16 | 2 | 743 | 16.718/ 15.493 |
| 17 | 3 | 744 | 16.740/ 15.690 |
| 18 | 1 | 761 | 17.123/ 15.723 |

FIG. 5

```
100 REM X=RND
110 REM X=INT(RND*20)
115 X=Fr
116 REM X=Fr1
.20 Bp=Az+(Fr*.0225)+(X-9)*(-.007*25)
```

| PULSE | FREQ | PRI# | AZ: MECH/TRUE |
|---|---|---|---|
| 1 | 1 | 609 | 13.703/ 15.103 |
| 2 | 2 | 629 | 14.153/ 15.378 |
| 3 | 3 | 630 | 14.175/ 15.225 |
| 4 | 4 | 631 | 14.198/ 15.073 |
| 5 | 5 | 651 | 14.648/ 15.348 |
| 6 | 6 | 652 | 14.670/ 15.195 |
| 7 | 7 | 653 | 14.693/ 15.043 |
| 8 | 8 | 673 | 15.143/ 15.318 |
| 9 | 9 | 674 | 15.165/ 15.165 |
| 10 | 10 | 675 | 15.188/ 15.013 |
| 11 | 11 | 695 | 15.638/ 15.288 |
| 12 | 12 | 696 | 15.660/ 15.135 |
| 13 | 14 | 717 | 16.133/ 15.258 |
| 14 | 15 | 718 | 16.155/ 15.105 |
| 15 | 16 | 738 | 16.605/ 15.380 |
| 16 | 17 | 739 | 16.628/ 15.228 |
| 17 | 18 | 740 | 16.650/ 15.075 |
| 18 | 19 | 760 | 17.100/ 15.350 |

| PULSE | FREQ | PRI# | AZ: MECH/TRUE |
|---|---|---|---|
| 1 | 1 | 628 | 14.130/ 15.530 |
| 2 | 3 | 649 | 14.603/ 15.653 |
| 3 | 4 | 650 | 14.625/ 15.500 |
| 4 | 5 | 670 | 15.075/ 15.775 |
| 5 | 6 | 671 | 15.098/ 15.623 |
| 6 | 7 | 672 | 15.120/ 15.470 |
| 7 | 8 | 692 | 15.570/ 15.745 |
| 8 | 9 | 693 | 15.593/ 15.593 |
| 9 | 10 | 694 | 15.651/ 15.440 |
| 10 | 11 | 714 | 16.065/ 15.715 |
| 11 | 12 | 715 | 16.088/ 15.563 |
| 12 | 13 | 716 | 16.110/ 15.410 |
| 13 | 14 | 736 | 16.560/ 15.685 |
| 14 | 15 | 737 | 16.583/ 15.533 |
| 15 | 17 | 758 | 17.055/ 15.655 |
| 16 | 18 | 759 | 17.078/ 15.503 |
| 17 | 19 | 779 | 17.528/ 15.778 |

FIG. 6

```
100 REM X=RND
110 REM X=INT(RND*20)
115 X=Fr
116 REM X=Fr1
120 Bp=Az+(Fr*.0225)+(X-9)*(.007*25)
```

| PULSE | FREQ | PRI# | AZ: MECH/TRUE |
|---|---|---|---|
| 1 | 19 | 598 | 13.455/ 15.205 |
| 2 | 19 | 603 | 13.568/ 15.318 |
| 3 | 19 | 606 | 13.635/ 15.385 |
| 4 | 18 | 610 | 13.725/ 15.300 |
| 5 | 16 | 621 | 13.973/ 15.198 |
| 6 | 15 | 624 | 14.040/ 15.090 |
| 7 | 14 | 628 | 14.130/ 15.005 |
| 8 | 13 | 636 | 14.310/ 15.010 |
| 9 | 11 | 666 | 14.985/ 15.335 |
| 10 | 9 | 678 | 15.255/ 15.255 |
| 11 | 6 | 693 | 15.593/ 15.068 |
| 12 | 2 | 723 | 16.268/ 15.043 |
| 13 | 2 | 731 | 16.448/ 15.223 |
| 14 | 2 | 737 | 16.583/ 15.358 |
| 15 | 0 | 746 | 16.785/ 15.210 |
| 16 | 0 | 748 | 16.830/ 15.255 |
| 17 | 0 | 753 | 16.943/ 15.368 |

| PULSE | FREQ | PRI# | AZ: MECH/TRUE |
|---|---|---|---|
| 1 | 19 | 619 | 13.928/ 15.678 |
| 2 | 19 | 620 | 13.950/ 15.700 |
| 3 | 17 | 623 | 14.018/ 15.418 |
| 4 | 18 | 630 | 14.175/ 15.750 |
| 5 | 16 | 637 | 14.333/ 15.558 |
| 6 | 15 | 645 | 14.513/ 15.563 |
| 7 | 16 | 647 | 14.558/ 15.783 |
| 8 | 14 | 649 | 14.603/ 15.478 |
| 9 | 14 | 660 | 14.850/ 15.725 |
| 10 | 12 | 673 | 15.143/ 15.668 |
| 11 | 8 | 694 | 15.615/ 15.440 |
| 12 | 7 | 716 | 16.110/ 15.760 |
| 13 | 5 | 726 | 16.335/ 15.635 |
| 14 | 3 | 739 | 16.628/ 15.578 |
| 15 | 1 | 756 | 17.010/ 15.610 |
| 16 | 1 | 761 | 17.123/ 15.723 |

FIG. 7

```
100 REM X=RND
110 REM X=INT(RND*20)
115 X=Fr
116 REM X=Fr1
120 Bp=Az+(Fr*.0225)+(X-9)*(-.007*25)
```

| PULSE | FREQ | PRI# | AZ: MECH/TRUE |
|-------|------|------|---------------|
| 1 | 0 | 604 | 13.590/ 15.165 |
| 2 | 0 | 607 | 13.658/ 15.233 |
| 3 | 2 | 613 | 13.793/ 15.018 |
| 4 | 2 | 626 | 14.085/ 15.310 |
| 5 | 4 | 640 | 14.400/ 15.275 |
| 6 | 5 | 644 | 14.490/ 15.190 |
| 7 | 6 | 648 | 14.580/ 15.105 |
| 8 | 6 | 650 | 14.625/ 15.150 |
| 9 | 8 | 669 | 15.053/ 15.228 |
| 10 | 9 | 678 | 15.255/ 15.255 |
| 11 | 11 | 698 | 15.705/ 15.355 |
| 12 | 11 | 699 | 15.728/ 15.378 |
| 13 | 12 | 704 | 15.840/ 15.315 |
| 14 | 14 | 707 | 15.908/ 15.033 |
| 15 | 16 | 724 | 16.290/ 15.065 |
| 16 | 17 | 732 | 16.470/ 15.070 |
| 17 | 18 | 740 | 16.650/ 15.075 |
| 18 | 17 | 741 | 16.673/ 15.273 |
| 19 | 18 | 742 | 16.695/ 15.120 |
| 20 | 18 | 749 | 16.853/ 15.278 |

| PULSE | FREQ | PRI# | AZ: MECH/TRUE |
|-------|------|------|---------------|
| 1 | 3 | 638 | 14.355/ 15.405 |
| 2 | 3 | 655 | 14.738/ 15.788 |
| 3 | 4 | 658 | 14.805/ 15.680 |
| 4 | 5 | 662 | 14.895/ 15.595 |
| 5 | 5 | 663 | 14.918/ 15.618 |
| 6 | 7 | 675 | 15.188/ 15.538 |
| 7 | 8 | 694 | 15.615/ 15.790 |
| 8 | 10 | 702 | 15.795/ 15.620 |
| 9 | 10 | 709 | 15.953/ 15.778 |
| 10 | 12 | 718 | 16.155/ 15.630 |
| 11 | 15 | 743 | 16.718/ 15.668 |
| 12 | 16 | 744 | 16.740/ 15.515 |
| 13 | 16 | 745 | 16.763/ 15.538 |

FIG. 8

```
100 REM X=RND
110 REM X=INT(RND*20)
115 REM X=Fr
116 X=Fr1
120 Bp=Az+(Fr*.0225)+(X-9)*(.007*25)
```

| PULSE | FREQ | PRI# | AZ: MECH/TRUE |
|---|---|---|---|
| 1 | 19 | 590 | 13.275/ 15.025 |
| 2 | 17 | 605 | 13.613/ 15.013 |
| 3 | 18 | 607 | 13.658/ 15.233 |
| 4 | 15 | 620 | 13.950/ 15.000 |
| 5 | 16 | 622 | 13.995/ 15.220 |
| 6 | 14 | 637 | 14.333/ 15.208 |
| 7 | 12 | 652 | 14.670/ 15.195 |
| 8 | 10 | 667 | 15.008/ 15.183 |
| 9 | 8 | 680 | 15.300/ 15.125 |
| 10 | 9 | 682 | 15.345/ 15.345 |
| 11 | 6 | 695 | 15.638/ 15.113 |
| 12 | 7 | 697 | 15.683/ 15.333 |
| 13 | 4 | 710 | 15.975/ 15.100 |
| 14 | 5 | 712 | 16.020/ 15.320 |
| 15 | 2 | 725 | 16.313/ 15.088 |
| 16 | 3 | 727 | 16.358/ 15.308 |
| 17 | 1 | 741 | 16.673/ 15.273 |

| PULSE | FREQ | PRI# | AZ: MECH/TRUE |
|---|---|---|---|
| 1 | 19 | 609 | 13.703/ 15.453 |
| 2 | 17 | 624 | 14.040/ 15.440 |
| 3 | 18 | 626 | 14.085/ 15.660 |
| 4 | 15 | 639 | 14.378/ 15.428 |
| 5 | 16 | 641 | 14.423/ 15.648 |
| 6 | 13 | 654 | 14.715/ 15.415 |
| 7 | 14 | 656 | 14.760/ 15.635 |
| 8 | 11 | 669 | 15.053/ 15.403 |
| 9 | 12 | 671 | 15.098/ 15.623 |
| 10 | 10 | 686 | 15.435/ 15.610 |
| 11 | 8 | 699 | 15.728/ 15.553 |
| 12 | 9 | 701 | 15.773/ 15.773 |
| 13 | 6 | 714 | 16.065/ 15.540 |
| 14 | 7 | 716 | 16.110/ 15.760 |
| 15 | 4 | 729 | 16.403/ 15.528 |
| 16 | 5 | 731 | 16.448/ 15.748 |
| 17 | 2 | 744 | 16.740/ 15.515 |
| 18 | 3 | 746 | 16.785/ 15.735 |
| 19 | 1 | 760 | 17.100/ 15.700 |

METHOD AND APPARATUS FOR OPERATING A SURFACE DETECTION SURVEILLANCE RADAR USING FREQUENCY AGILE PULSE TRANSMISSIONS

BACKGROUND OF THE INVENTION

1. Field of the Invention

The present invention relates to a method and apparatus for operating a surveillance radar, and in particular to surface detection radar, such as an ASDE (Airport Surface Detection Equipment radar) or a CSR (Coastal Surveillance Radar) which uses a low-cost end-fed, slotted array antenna in combination with frequency agile pulse transmissions for monitoring surface movement of targets. The frequency agile pulse transmissions improve the target detection performance of the radar in the presence of distributed clutter, i.e., rain, hail, etc. Additionally, the invention can reduce the effects of electronic interference at locations having multiple radars, or the intentional electronic jamming of the radar in an electronic warfare environment.

2. Description of the Prior Art

The purpose of surveillance radar, such as an ASDE radar for example, is to provide air traffic controllers of an airport with information on the location of surface traffic. The surface traffic is not confined solely to the moving traffic of aircraft and ground-based vehicles, but also includes parked or stationary aircraft and ground-based vehicles, since information on all surface traffic is essential to an air traffic controller for handling incoming and departing air traffic.

Surface surveillance radars, such as ASDE and CSR radars, are well known to those of ordinary skill in the art, and are described, for example by M. I. Skolnik in the book "Introduction to Radar Systems", 1962. One characteristic of such radars is degradation of target detection performance due to the effects of distributed clutter. In the ASDE case the distributed clutter is usually rain, while in the CSR case the distributed clutter is typically from the surface of the water and is referred to as "sea clutter".

It is known in the design of surveillance radar systems to be advantageous to use radar pulse transmissions of more than one frequency to illuminate a given target detection area. Use of more than one pulse frequency for detecting a target can change the targets' Swerling Case (a classification based on a characteristic fluctuation of the received power in the radar cross-section (RCS) area of the target), and is therefore particularly beneficial for improving target detection performance of the radar system in the presence of distributed clutter. Prior art radars, such as the ASDE-3 radar manufactured and commercially sold by Cardion, Inc of Woodbury, N.Y., typically use several different pulse frequencies for developing return signals representative of a given target detection area. The returns are then combined, resulting in an improvement in the target detection performance of the radar system (i.e., the signal-to clutter S/N ratio of the radar video signal is improved), due to de-correlation of the distributed clutter as compared with correlated returns from a point source reflector (target). However, such prior art radars are much more costly as compare to single frequency radars, since they conventionally use a complex and costly antenna system.

It would be desirable to provide surface detection radar which would allow the use of a lower cost antenna, yet would still allow multiple pulse frequencies to be used for improving the target detection performance of the system in the presence of distributed clutter. One such low-cost antenna is an end-fed slotted array. The design of an end-fed slotted array antenna is a technology that is well understood to those of ordinary skill in the radar technology. The resulting antenna has good gain and beamwidth performance characteristics, and is inherently reasonable in cost to manufacture as compared with large parabolic reflector antennas. Unfortunately, inherent in the design of an end-fed slotted array antenna is the fact that the position of the beam radiated therefrom (in a plane perpendicular to the rotating antenna), varies in angular position ("squints") from a direction which is normal to the radiating surface of the antenna, as a function of the radiated frequency. This phenomena is referred to as frequency squint and the amount of the angular variation is referred to as the squint angle. Due to the frequency dependency of the squint angle, incorporation of such an antenna in a multi-frequency radar in order to reduce the system cost becomes most problematic.

It would also be desirable to provide a surface detection radar which would not only use a lower cost antenna, but would also be frequency agile, that is, easily adjustable to allow multiple and selectable pulse frequencies to be used, for improving the target detection performance of the system in the presence of clutter, and for improving its' target detection performance in the event of either intentional or unintentional electronic interference, i.e., in a multi-radar system or in an electronic warfare environment, respectively.

Additionally, it would be desirable that the cost of making such a frequency agile system not increase the basic manufacturing cost very much as compared to a non-frequency agile system, and in fact it would be desirable for such a system to be of lower manufacturing cost.

SUMMARY OF THE INVENTION

In accordance with the principles of the invention, a surveillance radar is provided with a rotating, frequency squinting, end-fed slotted array antenna, which is caused to transmit a plurality of different carrier frequency pulses for successively illuminating specific antenna beam positions during rotation of the antenna. Upon reception of each radar signal return, a signal processor responsive to the frequency of each transmitted pulse and the mechanical pointing angle of the antenna at the time of transmission of each pulse, will determine the frequency dependent squint angle for the transmitted pulse and combine that angle with the instantaneous mechanical pointing angle of the antenna at the time of the pulse transmission, to determine the actual beam pointing angle for each pulse at the time of its transmission. On a per scan basis, i.e., one revolution of the antenna, the combination of the mechanical pointing angle of the antenna and the frequency choices for the pulse transmissions will assure that any targets in each of successive groups of the actual beam pointing angles during rotation of the antenna are illuminated by at least several of the transmitted pulses. The signal processor groups together the pulse signal returns from physically adjacent ones of the actual beam pointing angles for common processing, for improving the target detection performance of the radar system.

The criteria for choosing the difference amongst these frequencies is well know to those of ordinary skill in the radar art; in general these frequencies should be separated by 1/(pulse length) or greater. Depending upon the antenna design, this variation in the transmitted frequency typically causes the antenna beam to squint by some amount. This amount is precisely know when the frequency is known. Knowing the frequency and the squint characteristics of the antenna, the method and apparatus of the present invention puts a group of the pulse signal returns into a memory so that they may be recalled for signal processing which will result in pulse signal returns from the physically adjacent beam positions being grouped together for common processing.

In one preferred embodiment of the invention, a plurality of digital signal processors are linked to a common memory. A system controller controls the writing into and out of the memory of video signals representative of the pulse return signals as well as video signals representative of the pulse signal returns processed by the digital signal processors. Respective ones of the digital signal processors access specific portions of the memory having video signals representative of the those pulse signal returns from given ones of physically adjacent beam positions for grouping together those video signals for common processing.

BRIEF DESCRIPTION OF THE DRAWINGS

FIG. 4 is a print out of the result of the analysis provided by the flow chart of FIG. 3 for all of the transmissions which fall within two adjacent groups of the actual beam pointing angles;

FIGS. 5, 6, 7 and 8 are print outs of the result of the analysis provided by four modified versions of the flow chart of FIG. 3 for all of the transmissions which fall within two adjacent groups of the actual (true) beam pointing angles.

DETAILED DESCRIPTION OF THE DRAWINGS

The principles of the present invention are illustrated by an exemplary embodiment of an ASDE radar. It is contemplated, however, that the principles of the invention are applicable to other kinds of surface detection radars, such as Coastal Surveillance Radar (CSR) as well as other types of surveillance radars.

In the illustrated embodiment the following parameters are assumed:

Frequency band=9,500 to 10,000 MHz(Megahertz)
Pulse duration=0.04 microsecond
Pulse repetition rate=16000/second
Antenna beamwidth=0.4 degrees
Squint rate=+0.007 degrees/MHz
Antenna rotation rate=360 degrees/second
Pulses per beamwidth=17.8

Figure 1:
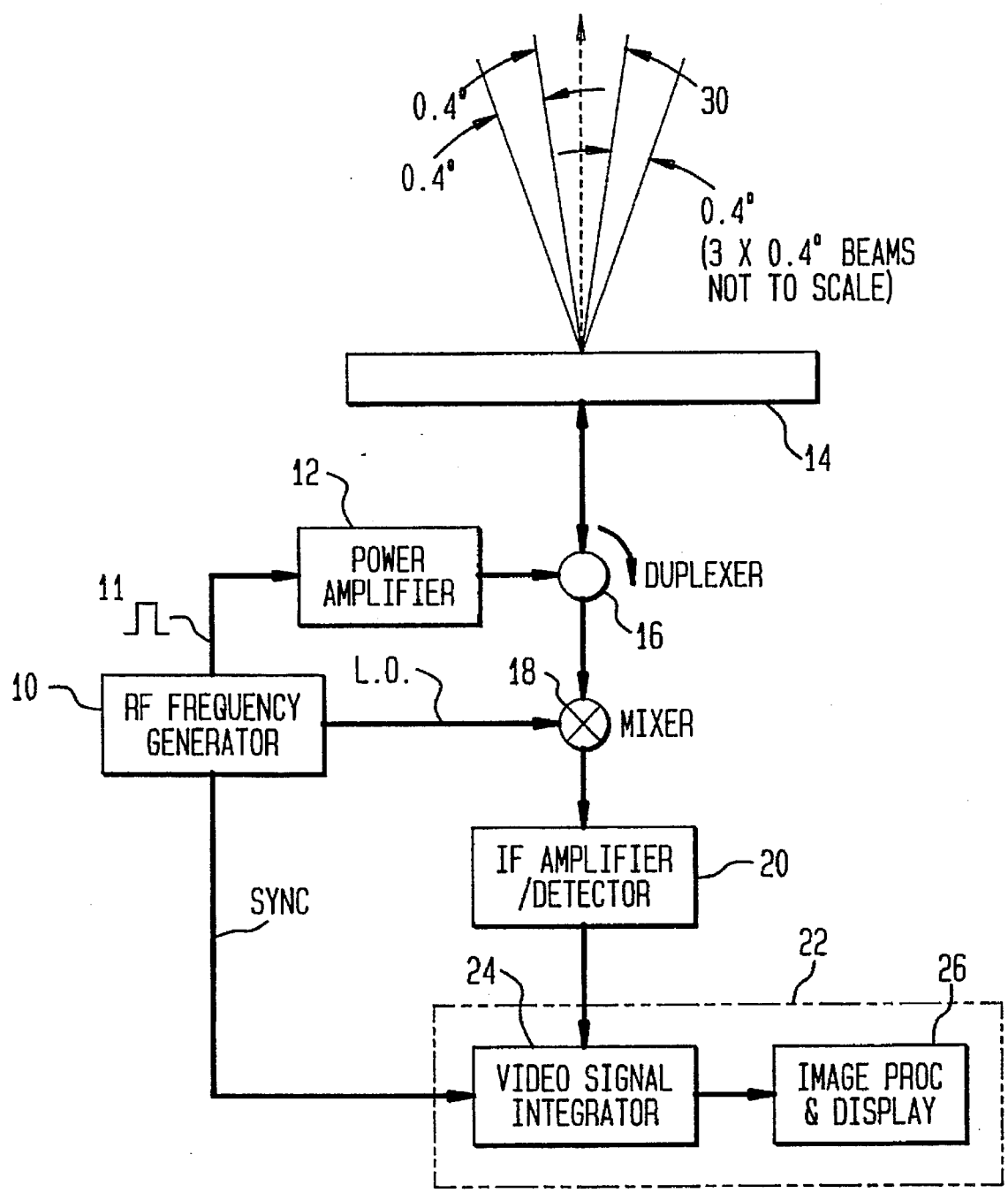
FIG. 1 is a block diagram of an ASDE radar system constructed in accordance with the principles of the present invention.

FIG. 1 is a block diagram of a conventional ASDE radar system, modified so as to be constructed in accordance with the principles of the present invention. As shown therein, a conventional ASDE radar includes an RF frequency generator 10 that generates successive transmit frequency pulses 11 that are amplified by a power amplifier 12 and applied to a rotating antenna 14, via a duplexer 16, for illuminating specific antenna beam positions during successive pulse repetition intervals (PRIs), as well known to those of ordinary skill in the radar art. Return signals from the transmitted pulses received by antenna 14 are applied to a signal mixer 18 via duplexer 16, where they are downconverted to an intermediate frequency (IF) in response to a local oscillator signal which is also applied to mixer 18 from RF frequency generator 10. An IF amplifier/detector stage 20 amplifies and peak detects the IF signals for generating a video signal representative of the received radar return signals. Video signal processing and display equipment 22 includes a video signal integrator 24, to be described, as well conventional image processing and display equipment 26 for providing the processed video signals to displays (not specifically shown) for use by air traffic controllers for monitoring traffic on the airport surface. As described so far, the ASDE system operates in a conventional and well known manner and for brevity further description of the construction and operation of the known portions of the radar are omitted.

In accordance with the principles of the present invention, the RF frequency generator 10 is controlled to successively provide different frequencies for the transmitted pulses 11, antenna 14 comprises a rotating end-fed slotted array antenna, and the video signal integrator 24 is provided for grouping together video representative of pulse signal returns from physically adjacent ones of the actual beam pointing angles for common processing, for improving the target detection performance of the radar system. Details concerning the general construction and operation of an end-fed slotted array antenna are well known to those of ordinary skill in the radar art, and therefore further description of antenna 12 is omitted. Furthermore, RF frequency generator 10 may comprise a known VCO type generator, and therefore further description of RF generator 10 is omitted.

Figure 2:
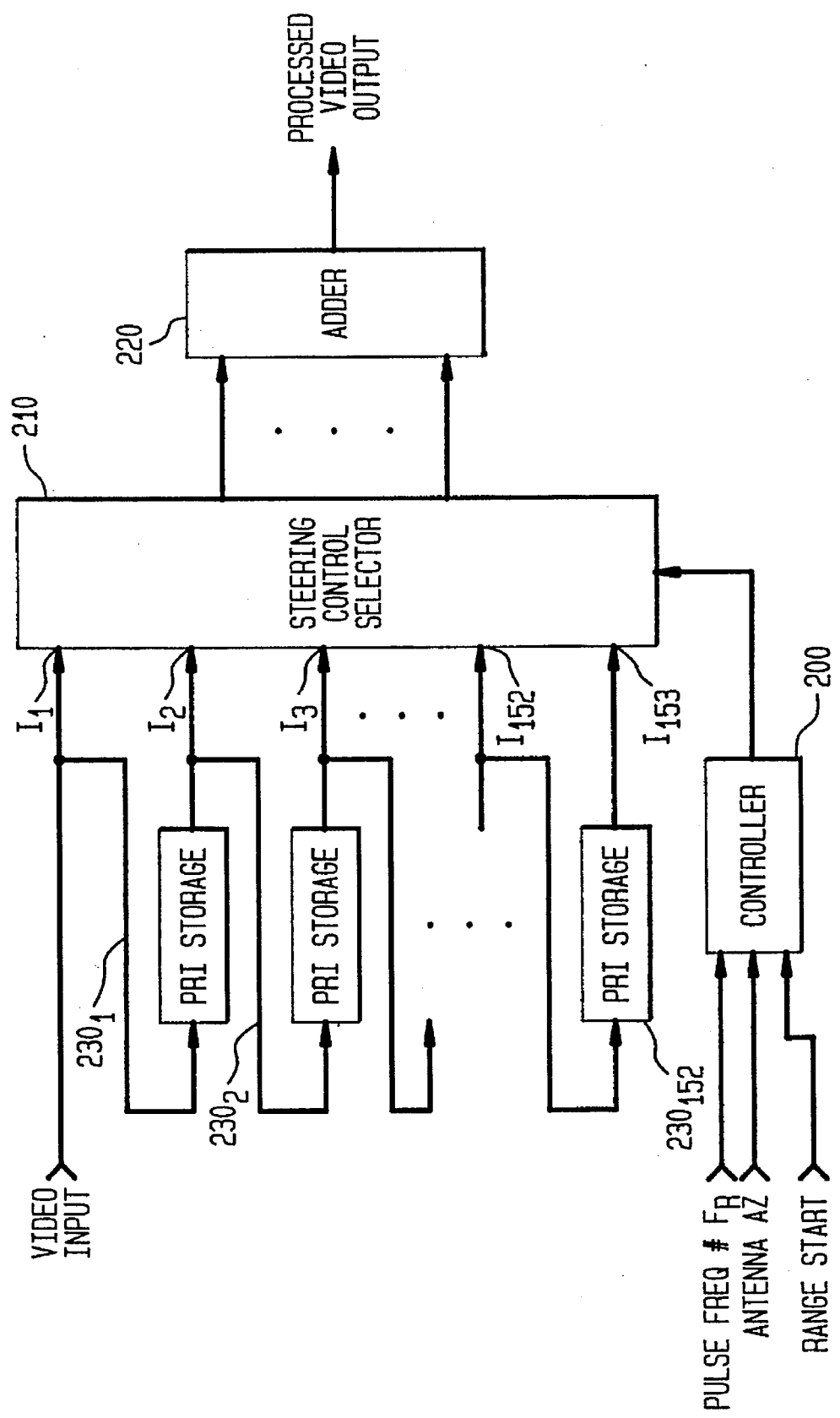
FIG. 2 is a block diagram of one preferred embodiment of the video signal integrator portion of the ASDE radar system shown in FIG. 1, constructed in accordance with the principles of the present invention.

FIG. 2 is a block diagram of a portion of the video signal integrator 24 of the ASDE radar system shown in FIG. 1, which processes the received signals (pulse return signals) in accordance with their actual successive beam positions $B_p$, so that they may be grouped together for common processing (weighting and summing) for improving the S/C of the video signals representative of successive beam positions.

Before further discussion of the construction and operation of video signal integrator 24, certain operating parameters of the illustrated ASDE radar will be described. By applying a criteria of separating the pulse transmission frequencies by 1/(pulse duration), the frequency spacing between adjacent pulse signals being transmitted is defined as 25 MHz. Assuming the full 500 MHz (10,000 Mhz–9,500 Mhz) is used, but avoiding the end values, results in 19 available pulse frequencies. Due to antenna 14 being a slotted array, the frequency squint of these 19 frequencies modify the mechanical pointing angle of the beam by approximately ±1.57 degrees (19 frequencies with 18 twenty-five MHz spaces between them, resulting in a squint of 0.007 degrees/MHz). Between two adjacent pulse transmissions the angular beam shift due to frequency squint is 25 MHz times 0.007 degrees/MHz or 0.175 degrees. Between two adjacent pulse transmissions the angular beam shift due to the mechanical rotation of the antenna is 360 degrees/sec. divided by 16,000 PRIs/sec, or 0.0225 degrees.

The instantaneous squint range in azimuth is 2×1.57 or 3.14 degrees and will take 3.14/360 or 0.00872 seconds. At a PRF (Pulse Repetition Frequency) of 16,000 pulses/ second, the transmitter will transmit about 140 pulses. Using the full 19 frequencies, each frequency will be transmitted 140/19 or over 7 times. Within the 3.14 degree azimuth window, there will be 3.14/.4 or 7.85 antenna beam positions (−3 db). Stated another way, the 140 pulses transmitted in successive PRIs by antenna 14 can be grouped into almost 8 adjacent beam positions, each beam position being 0.4 degrees wide. Three of such adjacent beam positions are shown by a waveform 30 in FIG. 1. Each of the return signals are also divided into range cells, typically 500 to 2000, and in the illustrated embodiment, 900 range cells.

Returning to FIG. 2, a block diagram video signal integrator 24 is illustrated. Its function is to provide an integration (weighting and summation) of selected ones of the transmitted pulses, whose output represents at each range cell the sum of all the video data in a given antenna beamwidth B. As noted above, the beamwidths are 0.4 degrees wide, and theoretically a maximum of 19 pulses can be combined to develop a video signal having an improved S/C ratio. A controller 200 is responsive to a range start signal (indicating the start of each PRI), the pulse frequency number $F_R$ and an indication of the mechanical pointing angle of the antenna azimuth $A_Z$, for developing control signals for causing a steering control selector 210 to provide video representative of selected ones of the previous 152 pulse return signals to an adder 220. The control signals provided by controller 200 assure that the correct video is supplied to adder 220 at the correct time; that is, the signals added must represent signals in a given beam position. For providing video representative of selected ones of the previous 152 pulse return signals, the digitized video is supplied not only to one input $I_1$ of selector 210, but it is also supplied in serial fashion to successive ones of 152 PRI storage elements $230_1$ through $230_{152}$. PRI storage elements $230_1$ through $230_{152}$ supply video which is delayed by successively increasing PRIs to inputs $I_2$ through $I_{153}$ of selector 210, respectively. Each PRI storage element saves an entire PRI of video data (i.e., 900 range cells in the illustrated embodiment) for use at the appropriate time as determined by controller 200. To those skilled in the radar art, it will be obvious that the PRI storage elements 230 could be accomplished in a number of ways. In addition, it would be possible to design the pulse frequency sequence to reduce the number of PRI storage elements required.

The detail characteristics of video signal integrator 24 may vary when applied to radar systems with different parameters. The radar system parameters will depend upon the intended function of the radar. These differing parameters and characteristics will determine the length and number of the individual PRI storage elements, which are provided to operate with the steering control selector 200 to direct the contents of the appropriate PRI storage elements to adder 220 at the appropriate time, thereby forming an integrator. As previously described, the video signal integration provides the processing improvement (improved S/C ration of the video signal), made possible by the use of frequency agility.

Based upon the parameters given above, a BASIC program was generated to illustrate processing in accordance with the invention. The program listing is found in Appendix 1, and should be referred to as needed during the following description.

Figure 3:
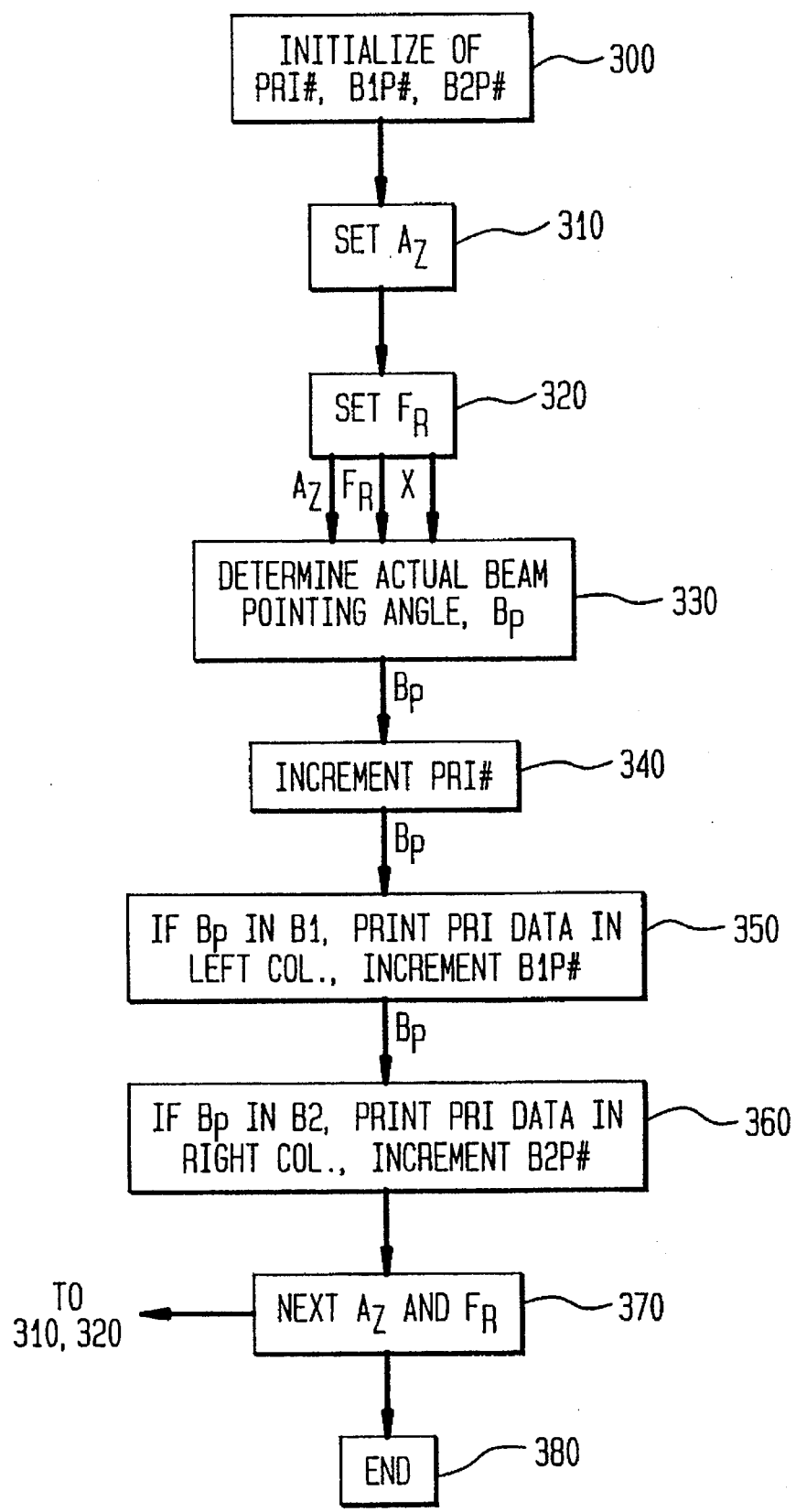
FIG. 3 is a flow chart of a program (shown in Appendix 1) that computes over an antenna mechanical azimuth position range of 0° to 36°, the actual (true) azimuth beam location (accounting for beam squint due to frequency agility) of all of a plurality of different frequency pulse transmissions during that 36° range.

FIG. 3 is a flow chart of the program, which computes over an illustrative antenna mechanical azimuth position range of 0° to 36°, the actual (true) azimuth beam location (accounting for beam squint due to frequency agility) of all of a plurality of different frequency pulse transmissions during the 36° range. Only a 36° range is needed since the remainder of the 360° contains no additional information, i.e., its just repetition. The program keeps track of which transmissions fall within two 0.4° antenna beamwidths, B1 and B2 (illustratively, 15.0° to 15.4°, and 15.4° to 15.8°), and prints these out in two side-by-side columns (Left and Right). These printouts (FIGS. 4–8) show that, despite the squinting of the beam due to the frequency agility, during mechanical rotation of the antenna there are approximately the expected 17.8 hits in each of the two beamwidths.

As shown by FIG. 3, in step 300, the PRI and Beam 1 and 2 Pulse Numbers (PRI#, B1P# and B2#) are initialized. Steps 310 and 320 sets and increments the antenna azimuth ($A_Z$) and pulse frequency ($F_R$). Step 330 determines the actual (true) beam pointing angle ($B_P$), taking into account the mechanical rotation of the antenna and the frequency squint of each pulse transmission. Step 340 increments the PRI number for determining the next $B_P$. Steps 350 and 360 are IF/THAN/ELSE steps, where, in step 350, IF the true pointing angle is in beam 1 (B1=15.4° to 15.8°), THAN the PRI data (pulse number, Frequency number, PRI number and mechanical/true pulse pointing angle) is printed in left column. If the true pointing angle is not in B1 (i.e., ELSE), step 360 is started. In step 360, IF the true pointing angle is in beam 2 (B2=15.4° to 15.8°), THAN the PRI data (pulse number, Frequency number, PRI number and mechanical/ true pulse pointing angle) is printed in the right column. After execution of either of steps 350 or 360, step 370 causes the process to start over with incremented values for the next azimuth and frequency. After 36° of azimuth range, step 380 ends the program.

In the BASIC program (referring also to Appendix 1), lines 170 and 171 cause a printed output for the 15.0 to 15.4 degree antenna beam position, while lines 190 and 195 cause a printed output for the 15.4 to 15.8 degree antenna position; the output for the latter is in the right-hand column. Looking at FIG. 4, note that there are 19 and 18 entries in the left-hand and right-hand columns, respectively. The transmitted frequency is denoted by "Freq", and for both right and left columns starts with 19, the highest frequency, and descends to 1. Note there are some reversals, i.e., frequency does not descend monotonically and a frequency may occasionally be skipped (e.g., $F_R 8$ shown in the right column. This frequency skipping results from chance alignment of the frequency squint with the mechanical angle ($A_Z$) of the antenna.

The "PRI#" column indicates the pulse transmission count, which starts at 0 when the boresight of the antenna mechanically points North. In a similar manner, the column headed "Az" indicates both the actual mechanical pointing angle relative to North (Mech), followed by the true angle (True), which accounts for the squint due to the change in pulse transmission frequency). Note that in accordance with this embodiment all frequencies are used in the left column; in the right column, all frequencies except frequency 8 are used. Thus, overall, the frequency agility in this embodiment is very good.

With modifications to lines 100 through 120 of the BASIC program (refer to Appendix 1), four versions of the program are presented. In the first version, shown in FIG. 5, the pulse frequencies are selected so that the beam squints forward, i.e., in the same direction as the mechanical rotation of the antenna. In the second version, FIG. 6, the pulse frequencies are selected so that the beam squints rearward, i.e., against the direction of antenna rotation. The third and fourth versions, FIGS. 7 and 8, replicate the first and second versions, except that the pulse frequencies are selected so that the beam squinting is random, i.e., the frequency to be transmitted is randomly chosen as one of the 19 possible frequencies.

In FIG. 5 line 120 has been modified to simulate sweeping the beam due to squinting in a direction opposite the direction of antenna rotation. This time 18 frequencies are processed in the first beam, and 17 frequencies are processed in the adjacent, second, beam. Frequencies not used in right beam were 2 and 16, with 13 not used in the left beam. Overall the frequency agility in this embodiment is still good.

In FIG. 6, lines 100 through 120 have been modified to select the 19 frequencies randomly. This results in the left beam having 17 transmissions, but only 11 frequencies; some are repeated. In the right beam, there are 16 transmissions using 12 different frequencies. This results in a reasonably good frequency agility and might have merit in Electronic Warfare scenarios.

In FIG. 7 lines 100 through 120 are modified to select the 19 frequencies randomly and the squint is rearward similar to FIG. 5. This changes the number of transmissions to 20 and 13 for the left and right printouts, respectively. The number of frequencies in the left column is 13, and 9 in the right column. Again, this may have merit for Electronic Warfare scenarios.

For FIG. 8 the BASIC program is revised so that the pulse frequency sequence can be set arbitrarily. This is accomplished by a DATA statement is line 215. Two things are accomplished by this. First, for each cycle of 19, every frequency is transmitted. Second, the pattern can be set so that adjacent frequencies are never transmitted on sequential PRFs. This second point can be important to those trained in the radar art as a useful means of avoiding "second time around" effects.

Storage and access for the frequency pattern sequence of the 19 frequencies is straight forward using PROM (Programmable Read Only Memory) or RAM (Random Addressable Memory), which is included in the RF frequency generator 10 of FIG. 1 for controlling its frequency, as well as for providing the frequency pattern information (labeled SYNC in FIG. 1) to video signal integrator 24. To improve the system performance in Electronic Warfare scenarios, a large number of PROMs, each having a different pattern, can be provided so that a particular frequency (or a particular PROM or PROM address) will be used infrequently per scan of the antenna and thus will be extremely difficult to predict/jam. To be effective, intentional jamming of the radar will require a very wide bandwidth, hence low energy density. Use of a RAM instead of a PROM would enable the frequency patterns to be changed by an external processor, which might be desirable in some situations.

Figure 9:
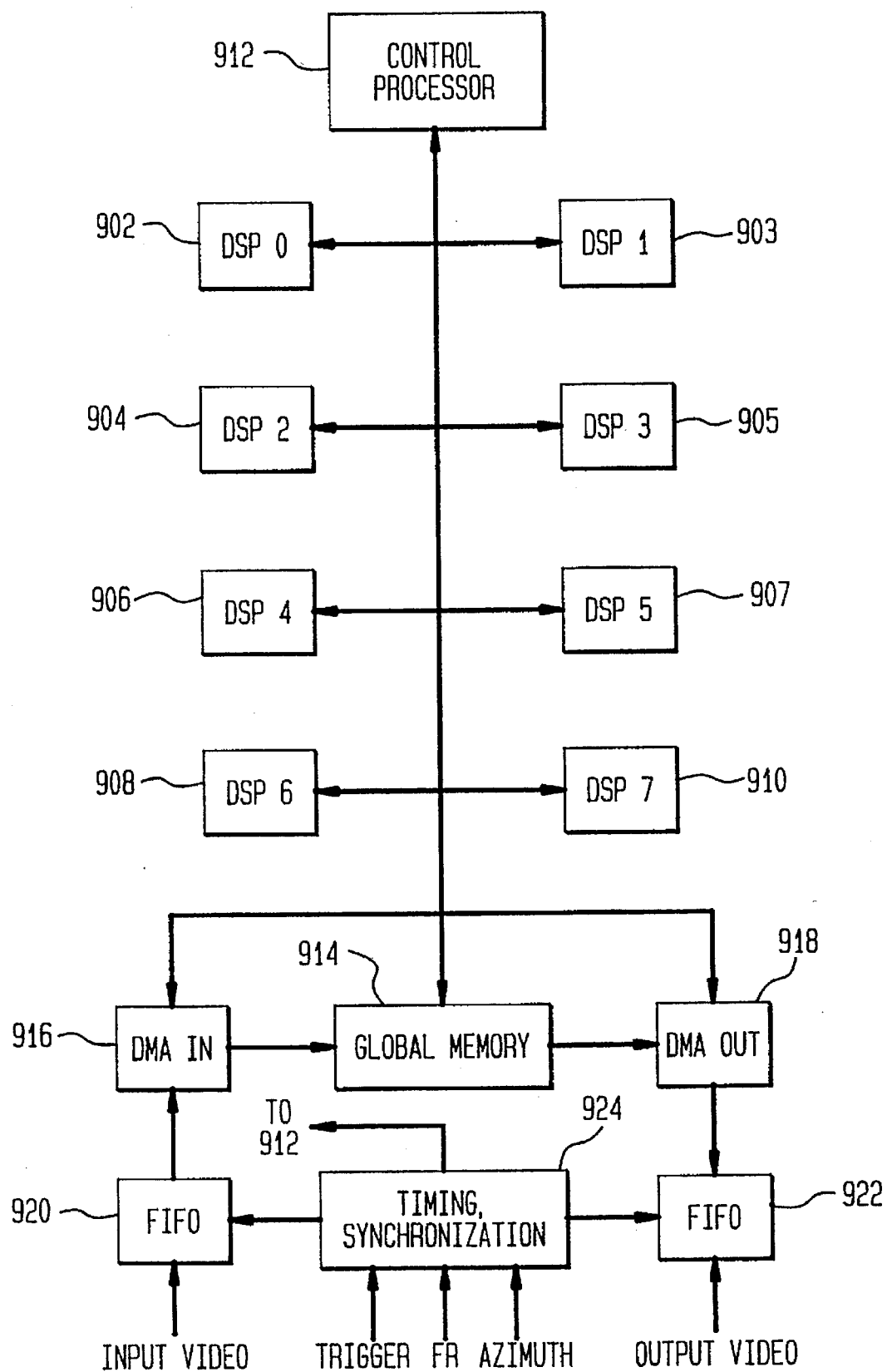
FIG. 9 is a block diagram of an alternative embodiment of the video signal integrator shown in FIG. 2.

FIG. 9 is a block diagram of an alternative embodiment of video signal integrator 24 shown in FIG. 2. In this embodiment digital signal processors (DSPs) implement the signal integration. A bus 900 permits communication analog eight DSPs 902–910, a control processor 912, a global memory 914, input and output digital memory access (DMA) controllers 916 and 918, respectively. Additionally, input and output FIFOs 920 and 922, respectively, are provided for time buffering of the input and output data, and a timing and synchronization block 924 (responsive to the radar start trigger, the pulse frequency $F_R$ and the antenna azimuth $A_Z$) develops control signals for controlling FIFOs 920,922 and provides timing information to control processor 912. The 153 PRIs (each having 900 range cells, using the parameters of the prior example), are stored in the global memory 914 for each PRI, and the DMA output controller controls read out of the global memory after the PRI data has been processed (integrated). Control processor 912 manages global memory 914, which is set up as a circular buffer, and tells DSPs 902–910 where the current PRI data is in memory 914 (since it knows the agility pattern), and where to save the result.

Thus there has been shown and described a novel method and apparatus for a surface detection radar which fulfills all the objects and advantages sought therefor. It should be understood by one skilled in the art that many modifications, variations and uses of the embodiments described herein are contemplated. For example, in the illustrated FIG. 2 and 9 embodiments, the video signal integration representative of successive PRIs having physically adjacent actual beam pointing angles could be accomplished using any specified weighting function for averaging the PRI data, such as rectangular, raised cosine or raised cosine squared, for example. Alternately, one could arrange a recursive digital delay filter with feedback factor adjusted for the 19 signals. Furthermore each integrator could be a run-and-dump device that is reset to 0 and each of the subsequent 19 signals are serially added range-cell by range-cell. Additionally, although all PRIs that fell within a given beam position, such as 19, don't have to be used in the integration. For example, perhaps only 6 of the PRIs falling in the middle of a 0.4° group of beams may be used. Since the improvement in clutter performance is a function of the square root of the number of signals being combined, using return signals from less than all 19 pulses results in less improvement in clutter performance, but may result in less smearing of the detected targets. All such changes, modifications and uses are intended to be covered by the appended claims.

APPENDIX 1

```
10    REM Prgram to compute squint effects for an end fed slotted array
20    REM when using frequency agility
40    Count1=0
50    Count2=0
60    Count3=0
70    PRINTER IS PRT
71    !
72    PRINT "Pulse";TAB(7);"Freq";TAB(12);"PRI#";TAB(18);
      " Az:Mech/True";TAB(36);
75    PRINT "Pulse";TAB(42);"Freq";TAB(47);"PRI#";TAB(53);
      " Az:Mech/True"
80    FOR Az=0 TO 36 STEP (19*.0225)
90    FOR Fr=1 TO 19
95    READ Fr1
100   REM X=RND
110   REM X=INT(RND*20)
115   REM X=Fr
116   X=Fr1
120   BP=Az+(Fr*.0225)+(X-9)*(.007*25)
130   Count2=Count2+1
131   !
140   IF Bp>15 AND Bp<15.4 THEN
142        GOTO 160
144   ELSE
146        GOTO 150
147   END IF
148   !
150   IF Bp>15.4 AND Bp<15.8 THEN
152        GOTO 180
154   ELSE
156        GOTO 200
157   END IF
158   !
160   Count1=Count1+1
170   PRINT Count1;TAB(7);X;TAB(12);Count2;TAB(18);
171   PRINT USING "DD.DDD,""/"",DD.DDD";Az+(Fr*.0225),Bp
173   GOTO 200
174   !
180   Count3=Count3+1
```

APPENDIX 1-continued

```
190  PRINT TAB(36);Count3;TAB(42);X;TAB(47);Count2;TAB(53);
195  PRINT USING "DD.DDD,"'/'",DD.DDD";Az+(Fr*.0225),Bp
200  NEXT Fr
205  RESTORE
210  NEXT Az
215  DATA 19,10,2,11,3,12,4,13,5,14,6,15,7,16,8,17,9,18,1
219  PRINTER IS CRT
220  END
```

We claim:

1. A surveillance radar for propagating electromagnetic pulse energy along a propagation path sweeping in range and azimuth across a region in space including a surveillance area, and processing return energy therefrom, comprising:

transmitting means for generating a sequence of at least two pulses of carrier signals, the frequency of the carrier signal of each of said pulses in said sequence being controllable so as to be of a different frequency;

a rotating, frequency squinting, slotted array antenna, responsive to said pulses of carrier signals for transmitting said pulses of carrier signals so as to successively illuminate specific antenna beam positions with electromagnetic energy pulses during rotation of the antenna, and receiving return signals in response to energy reflected from said beam positions by each of said successively transmitted pulses of carrier signals;

receive means for receiving each of said return signals and developing video signals representative thereof;

processing means for processing each of said video signals, said processing means being responsive to the frequency ($F_R$) of each transmitted pulse of carrier signals for determining a frequency dependent squint angle for the transmitted pulse of carrier signals and the mechanical pointing angle (Mech. $A_Z$) of the antenna at the time of transmission of each pulse of carrier signals, for determining the actual beam pointing angle (True $A_Z$) for each of the successively received video signals, and then integrating groups of said video signals together which have physically adjacent actual beam pointing angles; and display means for displaying said video signals so as to enable a user to detect targets in said surveillance area.

2. Apparatus in accordance with claim 1, wherein the frequency of adjacent ones of said pulses of carrier signal are separated by 1/pulse length.

3. Apparatus in accordance with claim 1, wherein said processing means comprises a plurality of storage elements for selectively storing video signals representative of successive ones of said return signals, a controller responsive to said frequency ($F_R$) of each transmitted pulse of carrier signals, the mechanical pointing angle (Mech. $A_Z$) of the antenna at the time of transmission of each pulse of carrier signals, and a range trigger signal indicative of the beginning of each 1/pulse length interval (PRI), for developing selector control signals, and a selector responsive to said selector control signals and each of said storage elements for controlling the passing to an adder of selected ones of said video signals, said selector grouping together for integration a group of video signals having physically adjacent actual beam pointing angles.

4. Apparatus in accordance with claim 3, wherein said integration includes weighting in accordance with a predetermined weighting function.

5. Apparatus in accordance with claim 1, wherein said processing means comprises a common memory for storing video signals representative of successive ones of said return signals, a controller responsive to said frequency ($F_R$) of each transmitted pulse, the mechanical pointing angle (Mech. $A_Z$) of the antenna at the time of transmission of each pulse of carrier signals, and a range trigger signal indicative of the beginning of each 1/pulse length interval (PRI) for developing control signals, and a plurality of digital signal processors coupled to a common memory and responsive to said control signals developed by said controller for selectively adding together selected ones of said video signals which are grouped together due to their having physically adjacent actual beam pointing angles.

6. Apparatus in accordance with claim 4, wherein said integration comprises a weighting and adding together of less than all said video signals in said video signal groups.

7. Apparatus in accordance with claim 4, wherein said sequence of successive pulses of carrier signals transmitted have a sequentially decreasing selected frequency.

8. Apparatus in accordance with claim 4, wherein said sequence of successive pulses of carrier signals transmitted have a sequentially increasing selected frequency.

9. Apparatus in accordance with claim 4, wherein said sequence of successive pulses of carrier signals transmitted have a randomly selected frequency.

10. Apparatus in accordance with claim 1, wherein said transmitting means comprises a voltage controlled oscillator.

11. Apparatus in accordance with claim 1, wherein said slotted array antenna is end-fed.

12. A method for operating a surveillance radar, comprising:

transmitting with a rotating, frequency squinting, slotted array antenna, a sequence of at least two pulses of carrier signals, the frequency of each of said pulses of carrier signals in said sequence being controllable so as to be of a different frequency, so as to successively illuminate specific antenna beam positions with electromagnetic energy pulses during rotation of the antenna;

receiving return signals in response to energy reflected from said beam positions by each of said successively transmitted pulses of carrier signals and developing video signals representative thereof;

processing each of said video signals, said processing being responsive to the frequency ($F_R$) of each transmitted pulses of carrier signal and a mechanical pointing angle (Mech. $A_Z$) of the antenna at the time of transmission of each of said pulses, for determining an actual beam pointing angle (True $A_Z$) for each of the successively received video signals, and then integrating groups of said video signals together which have physically adjacent actual beam pointing angles; and displaying said video signals after their integration, so as to enable a user to detect targets in said surveillance area.

13. The method of claim 12, wherein said processing determines a frequency dependent squint angle for each of the transmitted pulses of carrier signals, and combines that angle with the instantaneous mechanical pointing angle of the antenna at the time of that pulse transmission, for determining the actual beam pointing angle (True $A_Z$) for each of the successively received video signals.

* * * * *